United States Patent
Nakashima et al.

(10) Patent No.: US 9,852,502 B2
(45) Date of Patent: Dec. 26, 2017

(54) IMAGE PROCESSING APPARATUS

(71) Applicant: DENSO CORPORATION, Kariya, Aichi-pref. (JP)

(72) Inventors: Akira Nakashima, Ichinomiya (JP); Tetsuya Kimata, Ichinomiya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 240 days.

(21) Appl. No.: 14/923,135

(22) Filed: Oct. 26, 2015

(65) Prior Publication Data

US 2016/0117831 A1 Apr. 28, 2016

(30) Foreign Application Priority Data

Oct. 27, 2014 (JP) .................................. 2014-218581
Mar. 19, 2015 (JP) .................................. 2015-056230

(51) Int. Cl.
*G06K 9/00* (2006.01)
*G06T 7/00* (2017.01)

(52) U.S. Cl.
CPC .... *G06T 7/001* (2013.01); *G06T 2207/10012* (2013.01); *G06T 2207/30168* (2013.01); *G06T 2207/30261* (2013.01)

(58) Field of Classification Search
None
See application file for complete search history.

(56) References Cited

U.S. PATENT DOCUMENTS 6,115,489 A  *  9/2000  Gupta .................. G06F 19/321
                                                         382/141
6,501,849 B1 * 12/2002  Gupta .................. G06F 19/321
                                                         382/141
8,154,594 B2 *  4/2012  Seki .......................... B60R 1/00
                                                         348/119

(Continued)

FOREIGN PATENT DOCUMENTS

JP    H11-088585 A    3/1999
JP    2003-083742 A   3/2003

(Continued)

*Primary Examiner* — Jayesh A Patel
(74) *Attorney, Agent, or Firm* — Knobbe, Martens, Olson & Bear, LLP (57) ABSTRACT

An image processing apparatus includes an image processing section periodically performing image processing for a periodically captured image, a diagnosing section comparing an image processing result obtained from diagnostic image data with an expected value data which indicates a reference for a normal processing result of image processing of the diagnostic image data and determining whether the image processing result obtained from the diagnostic image data is normal, by making the image processing section perform image processing for the diagnostic image data which is directly accessible by the image processing section in parallel with image processing periodically performed by the image processing section for the captured image, and an output controlling section outputting the processing result of image processing for the captured image as valid to a control section on condition that the image processing result obtained from the diagnostic image data is determined as normal by the diagnosing section.

9 Claims, 8 Drawing Sheets

(56) References Cited

U.S. PATENT DOCUMENTS

| | | | |
|---|---|---|---|
| 8,824,731 B2* | 9/2014 | Maggiore | G06T 7/001 |
| | | | 382/103 |
| 2003/0165268 A1* | 9/2003 | Franz | G06T 7/00 |
| | | | 382/181 |
| 2006/0187303 A1 | 8/2006 | Bothe et al. | |
| 2012/0308082 A1 | 12/2012 | Murao et al. | |
| 2015/0086079 A1 | 3/2015 | Murao et al. | |
| 2015/0117715 A1 | 4/2015 | Murao et al. | |
| 2016/0301923 A1* | 10/2016 | Ichige | H04N 5/23229 |

FOREIGN PATENT DOCUMENTS

| | | |
|---|---|---|
| JP | 2006-506924 A | 2/2006 |
| JP | 2006-313498 A | 11/2006 |
| JP | 2008-065555 A | 3/2008 |
| JP | 2015-066956 A | 4/2015 |

\* cited by examiner

IMAGE PROCESSING APPARATUS

CROSS-REFERENCE TO RELATED APPLICATION

This application is based on and claims the benefit of priority from earlier Japanese Patent Applications No. 2014-218581 filed Oct. 27, 2014 and No. 2015-56230 filed Mar. 19, 2015, the descriptions of which are incorporated herein by reference.

BACKGROUND

Technical Field

The present invention relates to an image processing apparatus which performs an image processing operation for image data captured by a camera.

Related Art

Techniques are known with which various types of image processing operation are performed, such as object recognition, for an image captured by a camera or the like. For example, JP-A-2003-83742 describes a technique for deriving a parallax between corresponding points of a pair of stereo images and obtaining distance information of a target object.

In the above image processing technique, erroneous recognition of image may occur due to fault of the processor which performs an image processing operation. Accordingly, there is a need of a fault diagnosis method that allows for immediate detection of abnormality in the image processing operation without disturbing a usual routine of the image processing operation.

SUMMARY

An embodiment provides a technique of fault diagnosis performed in a parallel manner without disturbing a usual routine of an image processing operation in fault diagnosis of an image processing apparatus.

As an aspect of the embodiment, an image processing apparatus includes: an image processing section that periodically performs an image processing operation for a captured image periodically captured by a capturing section; a diagnosing section that compares an image processing result obtained from diagnostic image data with an expected value data which indicates a reference for a normal processing result of the image processing operation of the diagnostic image data and determines whether or not the image processing result obtained from the diagnostic image data is normal, by making the image processing section perform an image processing operation for the diagnostic image data stored in advance in a main storage unit which is directly accessible by the image processing section in parallel with the image processing operation periodically performed by the image processing section for the captured image; and an output controlling section that outputs the processing result of the image processing operation for the captured image as valid to a predetermined control section on condition that the image processing result obtained from the diagnostic image data is determined as normal by the diagnosing section.

DETAILED DESCRIPTION OF THE PREFERRED EMBODIMENTS

With reference to the drawings, embodiments of the present invention will be described. The present invention is not limited to the following embodiments and can be implemented in various embodiments.

First Embodiment

[Description of Configuration of Image Processing Apparatus]

Figure 1:
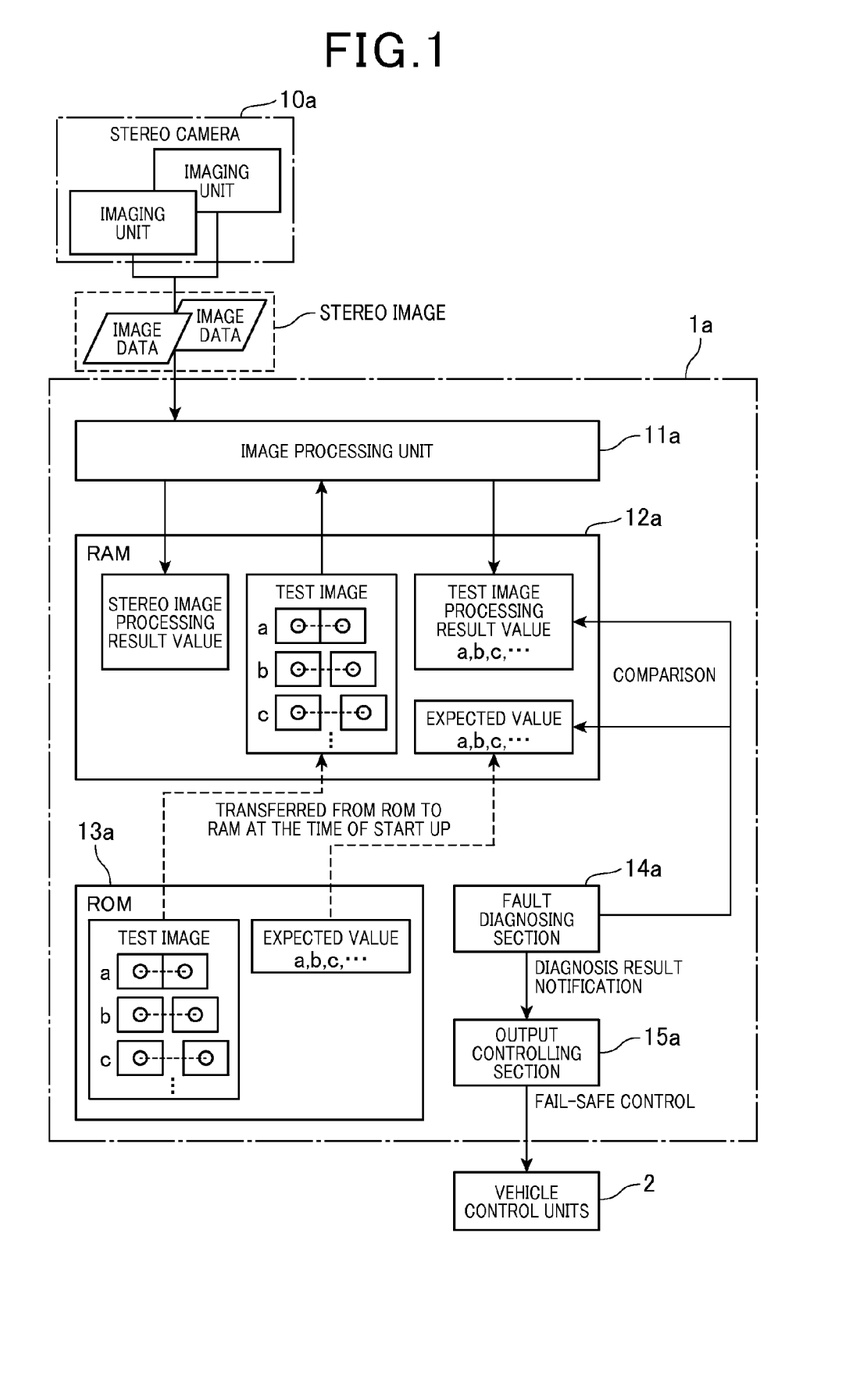
FIG. 1 is a block diagram which shows a configuration of an image processing apparatus according to a first embodiment.

Referring to FIG. 1, a configuration of an image processing apparatus $1a$ according to the first embodiment will be described. The image processing apparatus $1a$ includes a computer which is provided with a CPU, a ROM, a RAM and the like and is configured to perform an image processing operation (image processing) in which a parallax between a pair of stereo images captured by a stereo camera $10a$ is calculated, and distance information of a target in the image is obtained. The image processing apparatus $1a$ is installed, for example, in a vehicle, and is embodied as a vehicular system that generates distance information which is used for various vehicular controls (described later). A specific configuration of the image processing apparatus $1a$ includes an image processing unit $11a$, a RAM $12a$, a ROM $13a$, a fault diagnosing section $14a$, and an output controlling section $15a$.

The stereo camera $10a$ includes a pair of right and left imaging units which are positioned at parallel and equal positions similar to a known stereo camera. The stereo camera $10a$ is configured to repeatedly acquire the image data made up of a pair of right and left stereo images by capturing the images of the same region at the same timing by using the pair of imaging units, and output the acquired image data to the image processing unit $11a$.

The image processing unit $11a$ performs the image processing operation for calculating a parallax value between the stereo images on the basis of the frames of the stereo images inputted by the stereo camera $10a$. The image processing unit $11a$ repeatedly performs the image processing operation at the same cycle as that of frame rate (e.g., 40 FPS (frame per second)) of the images repeatedly acquired by the stereo camera $10a$.

The image processing unit $11a$ calculates a horizontal parallax between the stereo images for each of the image blocks, which are segments of the entire image, and generates a parallax value map in which the calculated horizontal parallaxes are correlated to coordinates on the image. The horizontal parallax can be calculated by using a technique such as stereo matching. Since the stereo matching is a known technique, the description thereof is omitted.

The RAM 12a is a storage device (random access memory) which is used as a main memory of the CPU and accessible by the image processing unit 11a at the highest speed. The RAM 12a stores a processing result value (parallax value map) which is a result of the image processing operation performed by the image processing unit 11a for the image data inputted by the stereo camera 10a.

Further, the RAM 12a stores a plurality of sets of data of test image which are used for fault diagnosis of the image processing unit 11a. The test image is made up of a pair of images which simulate the stereo images captured by the stereo camera 10a. In order to exhaustively verify the parallax values that the system can provide, a plurality of sets of test images having different parallax values obtained by the image processing operation are stored in the RAM 12a. The RAM 12a further stores a plurality of expected value data which correspond to the plurality of sets of test images. The expected value data provide information which indicates a normal result value to be obtained from the image processing operation performed by the image processing unit 11a for the test images. The RAM 12a further stores a result value which is the result of the image processing operation performed by the image processing unit 11a for the test images.

The ROM 13a is a storage device dedicated for reading (read only memory). The ROM 13a stores the test images which are loaded in the RAM 12a, the original test images provided as an original for the expected value data that correspond to the respective test images, and the expected value data. The test images and the expected value data stored in the ROM 13a are transferred from the ROM 13a to the RAM 12a on starting up the image processing apparatus 1a, and loaded in a predetermined region of the RAM 12a.

The fault diagnosing section 14a makes the image processing unit 11a perform the image processing operation by using the plurality of sets of test images loaded in the RAM 12a. The fault diagnosing section 14a compares the processing result value of the test image with the expected value data that corresponds to each of the test images, and diagnoses whether or not the image processing unit 11a has a fault. The fault diagnosing section 14a periodically performs the fault diagnosis by using the test image in parallel with a routine of the image processing operation performed by the image processing unit 11a for the stereo images acquired by the stereo camera 10a.

The output controlling section 15a performs output control for the processing result value of the stereo images on the basis of a diagnosis result from the fault diagnosing section 14a. Specifically, when the diagnosis result of the fault diagnosing section 14a is determined to be normal, the output controlling section 15a outputs the processing result of the image processing operation of the stereo images as valid. The processing result outputted as valid from the output controlling section 15a is outputted to vehicle control units 2 and is used for information presentation to a driver (user) of the vehicle or vehicular control for safety driving. On the other hand, when the diagnosis result from the fault diagnosing section 14a is determined to be abnormal, fail-safe control is performed.

The vehicle control units 2 include a plurality of units that control the operation of various control targets in the vehicle such as a body system, a power train system, and a chassis system. The control targets are, for example, a steering unit, a speaker, a display, a braking unit, a drive unit, and lamps. Those units included in the vehicle control units 2 control the operation of control targets in response to a traveling state of the vehicle or a recognition result of the target by the image processing apparatus 1a. Specifically, the units perform known vehicular controls such as collision prevention, speed warning, lane departure prevention, rear end collision prevention, inter-vehicle hazard warning, lane departure warning, automatic high beam, sign display, entire vehicle speed adaptive cruise control (ACC), lane keeping, lane-change accident prevention, blind spot warning, blind spot monitor, automatic lane changing, cross traffic alert, pedal error prevention, and automatic parking.

[Description of Image Processing Operation for Each Frame]

Referring to the flowchart of FIG. 2, a procedure of operations performed by the respective units of the image processing apparatus 1a will be described. The operations are periodically performed every time when the frames of the pair of stereo images are inputted from the stereo camera 10a. Note that, as a premise, the plurality of sets of test images and the expected value data which correspond to the test images have been transferred in advance from the ROM 13a to the RAM 12a on starting up the image processing apparatus 1a.

In step S100, the image processing unit 11a performs the image processing operation for calculating a parallax value between the images of the two frames of the pair of stereo images acquired by the stereo camera 10a. The image processing unit 11a stores the processing result values of the stereo images in the RAM 12a.

In step S102, the fault diagnosing section 14a makes the image processing unit 11a perform the image processing operation to calculate a parallax value of each of the test images by using the plurality of sets of test images loaded in the RAM 12a during a time period after the image processing operation of step S100 is completed and before the processing result value is outputted. The image processing unit 11a stores the processing result values of the test images in the RAM 12a.

In step S104, the fault diagnosing section 14a compares the processing result value of each of the test images stored in the RAM 12a with the expected value data which corresponds to each of the test image loaded in the RAM 12a in advance, and determines whether or not the image processing result is normal based on the match between the processing result value and the expected value data. When the processing result value of the test image and the expected value data which corresponds to the test image satisfy the match criteria, the image processing result is determined to be normal. On the other hand, when they do not satisfy the match criteria, the image processing result is determined to be abnormal (that is, the image processing unit 11a has a fault). Meanwhile, in step S108, another calculating unit (not shown in the figure) performs various calculating operations based on the image processing result of the stereo images performed by the image processing unit 11a in parallel with the processing operation by the fault diagnosing section 14a.

In step S110, a branching process is performed for the output controlling section 15a depending on the determination result by the fault diagnosing section 14a of step S104. When the determination result of step S104 is determined to be normal (step S110: normal), the process proceeds to step S112. In step S112, the output controlling section 15a outputs the processing result of the current stereo images as a valid processing result. Further, the output controlling section 15a notifies a driver via the vehicle control units 2 that the functions of the image processing unit 11a concerning the image processing operation are available.

When the determination result of step S104 is determined to be abnormal (abnormal in step S110), the process proceeds to step S113. In step S113, a branching process is performed for the output controlling section 15a depending on whether or not an event in which an abnormality is detected consecutively occurs for a predetermined number of times. When an event in which an abnormality is detected does not occur consecutively for a predetermined number of times, the process proceeds to step S114. In step S114, the output controlling section 15a performs fail-safe control. Specifically, the output controlling section 15a does not output the processing result concerning the current stereo images and cancels it. Further, the output controlling section 15a notifies a driver via the vehicle control units 2 that the functions concerning the image processing unit 11a for the image processing operation are unavailable.

When an event in which an abnormality is detected occurs consecutively for a predetermined number of times (consecutive predetermined number of times in step S113), the process proceeds to step S115. In step S115, the output controlling section 15a performs a restoration operation for the image processing unit 11a. Specifically, the output controlling section 15a retransfers the data of the test image from the ROM 13a to the RAM 12a to reset the data of test image in the RAM 12a. Further, configuration information of the system LSI that constitutes the image processing unit 11a is reloaded to attempt reconfiguration of the image processing unit 11a. As a modification, the restoration operation may be performed when a single event occurs in which the processing result value of the test image is determined to be abnormal.

[Advantageous Effect of First Embodiment]

According to the image processing apparatus 1a of the first embodiment, the following advantageous effect can be provided. Since the fault diagnosis is periodically performed by using the test image loaded in advance in the RAM 12a in parallel with a routine of the image processing operation for the stereo images which are periodically inputted, a fault in the image processing unit 11a can be diagnosed in real time without disturbing a usual routine of the image processing operation.

In particular, since the test image used for the fault diagnosis is loaded in advance in the RAM 12a which is quickly accessible by the image processing unit 11a, processing operations of the fault diagnosing section 14a can be performed at a high speed in accordance with a cycle of the image processing operation for the stereo images. Further, since a plurality of sets of test images having different processing result values obtained by the image processing operation are used for the fault diagnosis, the processing result values that the system can provide can be exhaustively verified.

When an abnormality is detected as a result of fault diagnosis, the output controlling section 15a performs fail-safe control in which the result of the image processing operation is canceled and abnormality is notified, thereby preventing an erroneous operation caused by an erroneous image processing result. Further, when an event in which an abnormality is detected consecutively occurs during the fault diagnosis, a restoration can be attempted by the output controlling section 15a performing a restoration operation, thereby improving availability of the system.

[Modifications of First Embodiment]

In the first embodiment, an example is described in which the test image and the expected value data stored in the ROM 13a which is provided in the image processing apparatus 1a are transferred to the RAM 12a on starting up the image processing apparatus 1a. Alternatively, the test image and the expected value data may be transferred to the RAM 12a from a storage unit connected to the outside of the image processing apparatus 1a.

Second Embodiment

Figure 3:
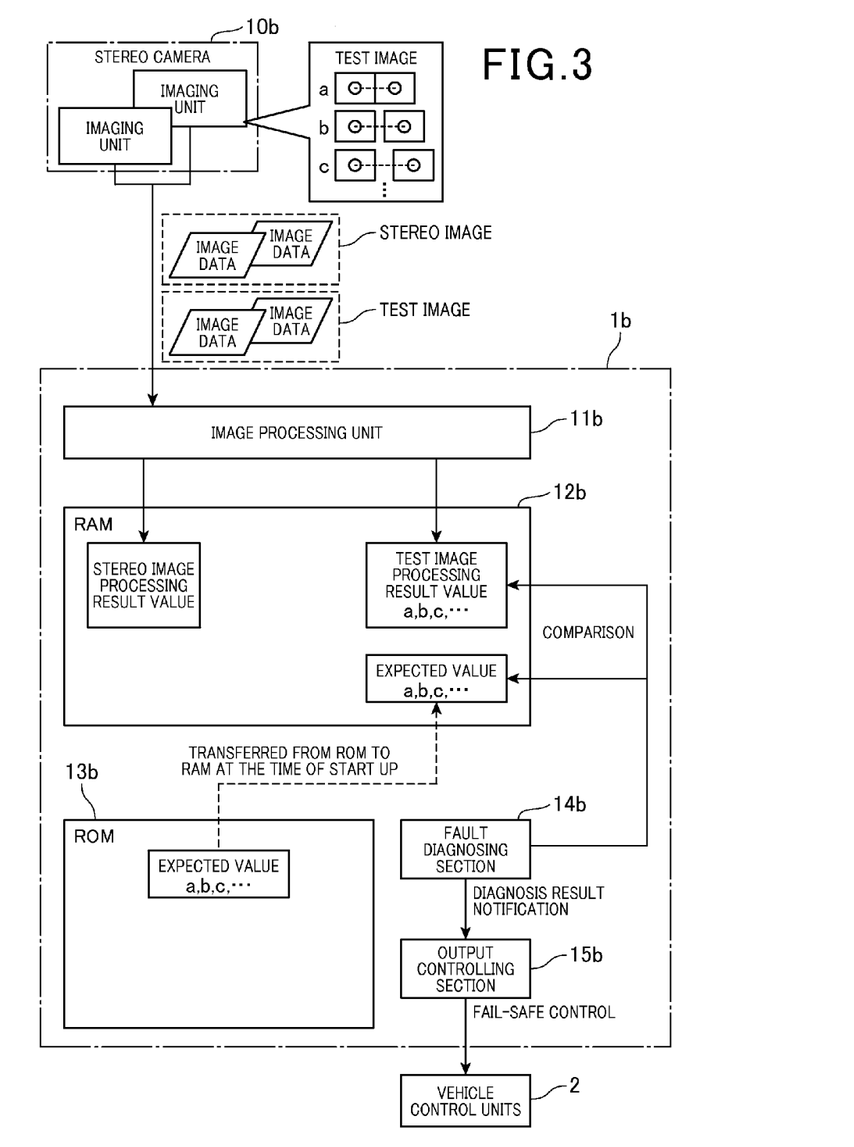
FIG. 3 is a block diagram which shows a configuration of an image processing apparatus according to a second embodiment.

Referring to FIG. 3, the configuration of an image processing apparatus 1b according to the second embodiment will be described. The image processing apparatus 1b includes an image processing unit 11b, a RAM 12b, a ROM 13b, a fault diagnosing section 14b, and an output controlling section 15b. Further, reference numbers 10b to 15b in the second embodiment correspond to reference numbers 10a to 15a in the first embodiment, respectively. The second embodiment will be described focusing on the difference from the image processing apparatus 1a of the first embodiment (see FIG. 1), and the description of the configuration and functions which are the same as those of the first embodiment are omitted.

The second embodiment differs from the first embodiment in that the data of test image used for fault diagnosis are stored in the stereo camera 10b. The test image is made up of a pair of images which simulate the stereo images captured by the stereo camera 10b. In order to exhaustively verify the parallax values that the system can provide, a plurality of sets of test images having different parallax values obtained by the image processing operation are stored in a storage unit (not shown in the figure) in the stereo camera 10b. The stereo camera 10b is configured to repeatedly acquire the image data made up of a pair of right and left stereo images, and output the acquired image data to the image processing unit 11b. Further, the stereo camera 10b periodically outputs the test image stored in the storage unit in parallel with the captured stereo images.

The fault diagnosing section 14b makes the image processing unit 11b perform the image processing operation by using the plurality of sets of test images inputted from the stereo camera 10b. Then, the fault diagnosing section 14b compares the processing result value of the test image with the expected value data that corresponds to each of the test images, and diagnoses whether or not the image processing unit 11b has a fault. The fault diagnosing section 14b periodically performs the fault diagnosis by using the test image in parallel with a routine of the image processing operation performed by the image processing unit 11b for the stereo images acquired by the stereo camera 10b.

The RAM 12b stores a processing result value (parallax value map) which is a result of the image processing operation performed by the image processing unit 11b for the image data inputted by the stereo camera 10b. The RAM 12b stores a plurality of expected value data which correspond to the plurality of sets of test images. The expected value data provide information which indicates a normal result value to be obtained by the image processing operation performed by the image processing unit 11b for the test images inputted from the stereo camera 10b. The RAM 12b further stores a result value which is the result of the image processing operation performed by the image processing unit 11b for the test images.

The ROM 13b stores the original expected value data provided as an original for the expected value data that correspond to the respective test images inputted from the stereo camera 10b. The expected value data stored in the ROM 13b are transferred from the ROM 13b to the RAM 12b on starting up the image processing apparatus 1b, and are loaded in a predetermined area of the RAM 12b.

Figure 2:
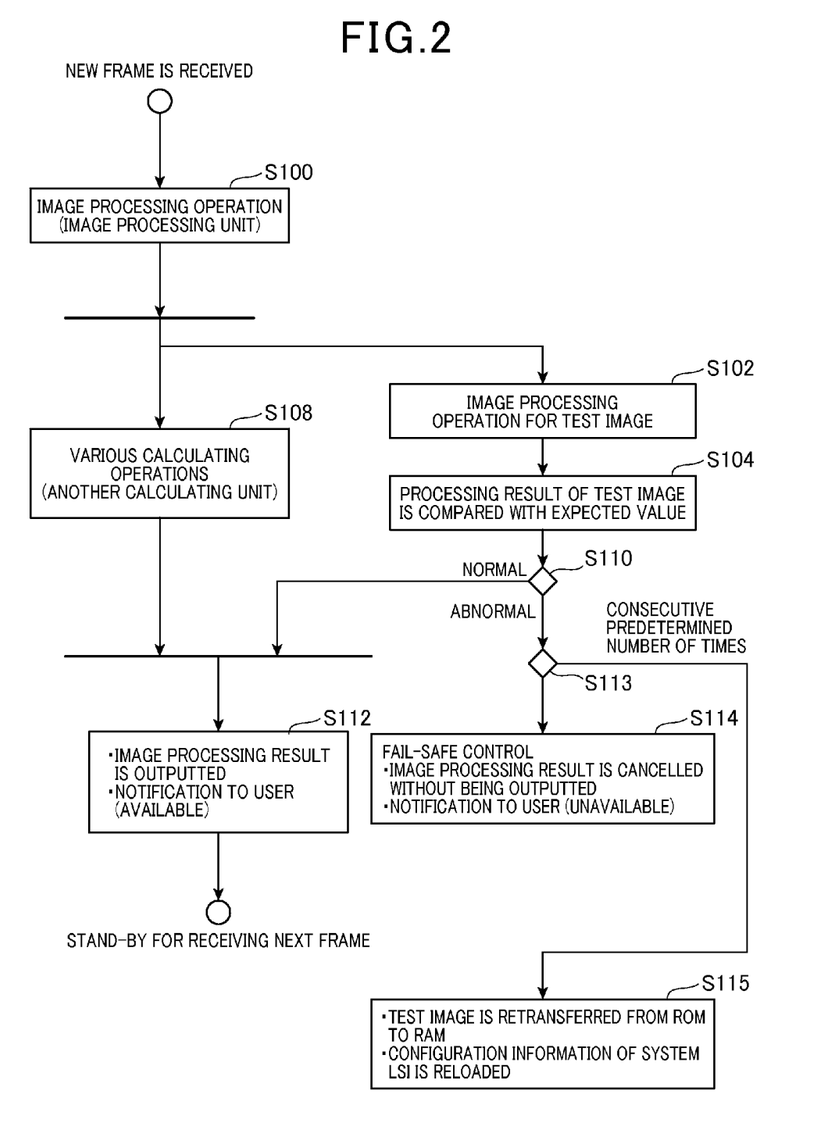
FIG. 2 is a flowchart which shows a procedure of an image processing operation for each frame.

The procedure of the image processing operation performed by each unit of the image processing apparatus 1b of the second embodiment corresponds to the procedure of the flowchart shown in FIG. 2, though step S102 in FIG. 2 is modified as described below in the second embodiment. That is, the fault diagnosing section 14b makes the image processing unit 11b perform the image processing operation to calculate a parallax value of each of the test images by using the plurality of sets of test images inputted from the stereo camera 10b during a time period after the completion of the image processing operation of step S100 and before the output of the processing result value. The image processing unit 11b stores the processing result values of the test images in the RAM 12b. Further, in the second embodiment, configuration information of the stereo camera 10b is reloaded to attempt reconfiguration of the stereo camera 10b instead of retransferring the data of test image to the RAM 12a in the restoration operation in step S115 in FIG. 2.

[Advantageous Effect of Second Embodiment]

According to the image processing apparatus 1b of the second embodiment, the following advantageous effect can be provided. The fault diagnosis is periodically performed by using the data of test image obtained from the stereo camera 10b in parallel with a usual periodic routine of the image processing operation by the image processing unit 11b. Accordingly, whether or not the input line from the stereo camera 10b or the image processing unit 11b has a fault or not can be monitored in real time without disturbing a usual routine of the image processing operation.

Third Embodiment

Figure 4:
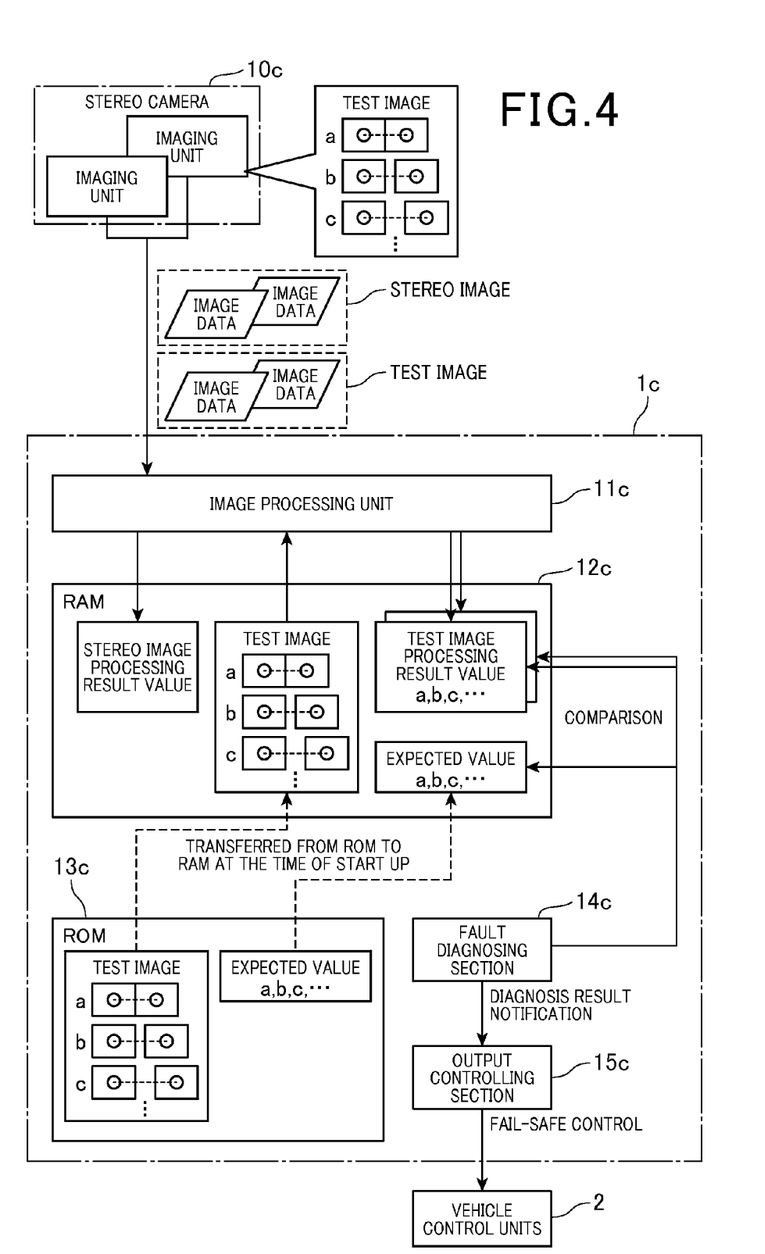
FIG. 4 is a block diagram which shows a configuration of an image processing apparatus according to a third embodiment.

Referring to FIG. 4, the configuration of an image processing apparatus 1c according to the third embodiment will be described. The image processing apparatus 1c includes an image processing unit 11c, a RAM 12c, a ROM 13c, a fault diagnosing section 14c, and an output controlling section 15c. Further, reference numbers 10c to 15c in the third embodiment correspond to reference numbers 10a to 15a in the first embodiment, respectively. The third embodiment will be described focusing on the difference from the first embodiment (see FIG. 1) and the second embodiment (see FIG. 3), and the description of the configuration and functions which are the same as those of the first embodiment and the second embodiment are omitted.

The third embodiment differs from the first and second embodiment in that the data of test image used for fault diagnosis are stored in the stereo camera 10c and the RAM 12c. The test image is made up of a pair of images which simulate the stereo images captured by the stereo camera 10c. In order to exhaustively verify the parallax values that the system can provide, a plurality of sets of test images having different parallax values obtained by the image processing operation are stored in a storage unit (not shown in the figure) in the stereo camera 10c and the RAM 12c.

The stereo camera 10c is configured to repeatedly acquire the image data made up of a pair of right and left stereo images, and output the acquired image data to the image processing unit 11c. Further, the stereo camera 10c periodically outputs the test image stored in the storage unit in parallel with the captured stereo images. The ROM 13c stores the test images which are loaded in the RAM 12c, the original test images provided as an original for the expected value data that correspond to the respective test images, and the expected value data. The test images and the expected value data stored in the ROM 13c are transferred from the ROM 13c to the RAM 12c on starting up the image processing apparatus 1c, and are loaded in a predetermined area of the RAM 12c.

The fault diagnosing section 14c performs the fault diagnosis for the test images by the stereo camera 10c and in the RAM 12c in a periodically alternating manner in parallel with a routine of the image processing operation performed by the image processing unit 11c for the stereo images acquired by the stereo camera 10c. Specifically, the fault diagnosing section 14c makes the image processing unit 11c perform the image processing operation by using a plurality of sets of the test images loaded in the RAM 12c. Then, the fault diagnosing section 14c compares the processing result value of the test image with the expected value data that corresponds to each of the test images, and diagnoses whether or not there is an abnormality. Further, the fault diagnosing section 14c makes the image processing unit 11c perform the image processing operation by using a plurality of sets of the test images inputted from the stereo camera 10c. Then, the fault diagnosing section 14c compares the processing result value of the test image with the expected value data that corresponds to each of the test images, and diagnoses whether or not there is an abnormality. The procedure of fault diagnosis performed by using each of the test images corresponds to that of step S100 to step S114 in the flowchart shown in FIG. 2.

The fault diagnosing section 14c identifies a fault location based on the diagnosis result of the test images of the stereo camera 10c and the RAM 12c. Then, the output controlling section 15c performs a restoration operation depending on the fault location identified by the fault diagnosing section 14c. Referring to the flowchart of FIG. 5, the procedure of those operations will be described.

Figure 5:
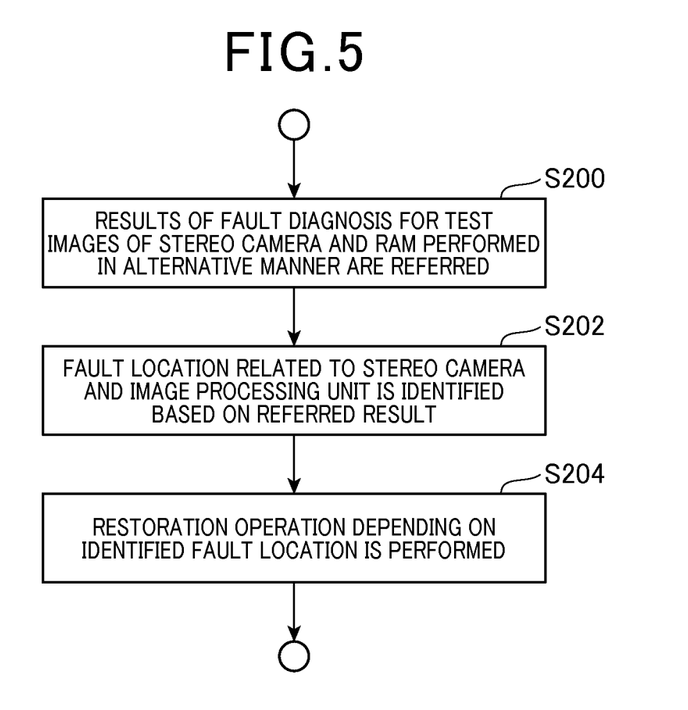
FIG. 5 is a flowchart which shows a procedure of fault location identification process.

In step S200, the fault diagnosing section 14c refers to the result of fault diagnosis performed for the test images of the stereo camera 10c and the RAM 12c in an alternating manner. In step S202, the fault diagnosing section 14c identifies a fault location related to the stereo camera 10c, the image processing unit 11c, or the test image based on combination patterns of the diagnosis results concerning each of the test images of the stereo camera 10c and the RAM 12c.

Specifically, when an abnormality is constantly diagnosed for each of the test images of the stereo camera 10c and the RAM 12c, the fault diagnosing section 14c determines that the image processing unit 11c has a fault. Alternatively, when an abnormality is diagnosed only when the test image of the stereo camera 10c is used, the fault diagnosing section 14c determines that the stereo camera 10c or the data of test image stored in the stereo camera 10c has a fault. Further, when an abnormality is diagnosed only when the test image of the RAM 12c is used, the fault diagnosing section 14c determines that the data of test image stored in the RAM 12c has a fault.

In step S204, the output controlling section 15c performs a restoration operation for the fault location identified in step S202. Specifically, when the image processing unit 11c is identified as having a fault, the output controlling section 15c reloads configuration information of the system LSI that constitutes the image processing unit 11c to attempt reconfiguration of the image processing unit 11c. Alternatively, when the stereo camera 10c or the data of test image stored in the stereo camera 10c is identified as having a fault, the output controlling section 15c reloads configuration information of the stereo camera 10b to attempt reconfiguration of the stereo camera 10b. Further, when the data of test image stored in the RAM 12c is identified as having a fault, the output controlling section 15c retransfers the data of test image from the ROM 13c to the RAM 12c to reset the data of test image of the RAM 12c.

[Advantageous Effect of Third Embodiment]

The fault location is identified by performing fault diagnosis by using each of the test images of the stereo camera 10c and the RAM 12c and the restoration operation is performed depending on the identified fault location, thereby isolating the fault location and improving availability.

Fourth Embodiment

Figure 6:
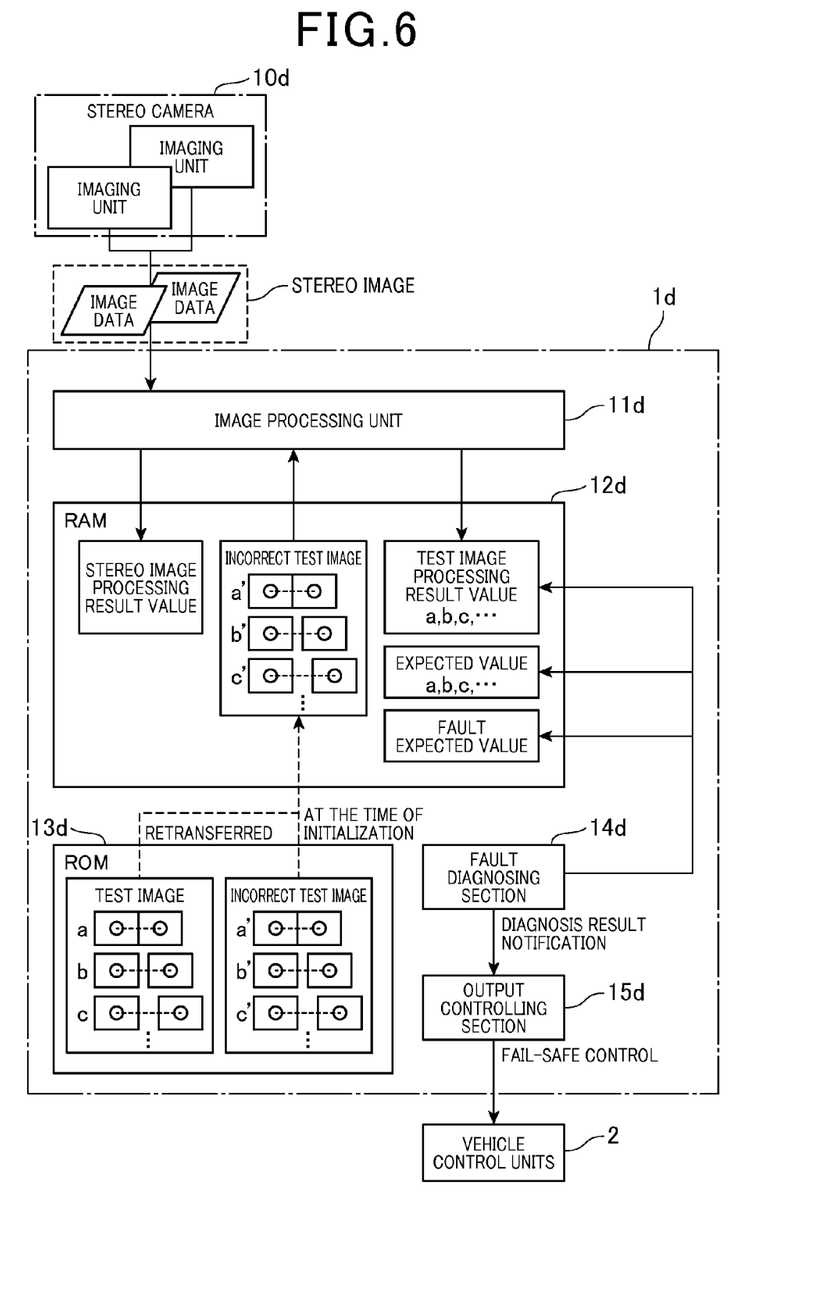
FIG. 6 is a block diagram which shows a configuration of an image processing apparatus according to a fourth embodiment.

Referring to FIG. 6, the configuration of an image processing apparatus 1d according to the fourth embodiment will be described. The image processing apparatus 1d includes an image processing unit 11d, a RAM 12d, a ROM 13d, a fault diagnosing section 14d, and an output controlling section 15d. Further, reference numbers 10d to 15d in the fourth embodiment correspond to reference numbers 10a to 15a in the first embodiment, respectively. The fourth embodiment will be described focusing on the difference from the first embodiment (see FIG. 1), and the description of the configuration and functions which are the same as those of the first embodiment are omitted.

The fourth embodiment differs from the first embodiment in that incorrect test images used for checking of a fault diagnosis function in addition to correct test images used for fault diagnosis are stored in the ROM 13d. The correct test images are the same as those described in the above first embodiment. The incorrect test image is made up of images which simulate the stereo images captured by the stereo camera 10d, similar to the correct test image. However, the incorrect test image is altered such that the processing result value obtained by the image processing operation correctly performed by the image processing unit 11d becomes incorrect to the expected value data.

In the image processing apparatus 1d according to the fourth embodiment, the incorrect test image stored in the ROM 13d is transferred to the RAM 12d and loaded in a predetermined region of the RAM 12d during initialization at the time of starting up. The fault diagnosing section 14d checks whether or not the fault diagnosis function operates correctly by using the incorrect test image transferred to the RAM 12d during initialization. Then, on condition that it is confirmed that the fault diagnosis function operates correctly, the correct test image is transferred from the ROM 13d to the RAM 12d, and subsequently, a usual routine of the image processing operation is started (see FIG. 2). Referring to the flowchart of FIG. 7, the procedure of those operations will be described.

Figure 7:
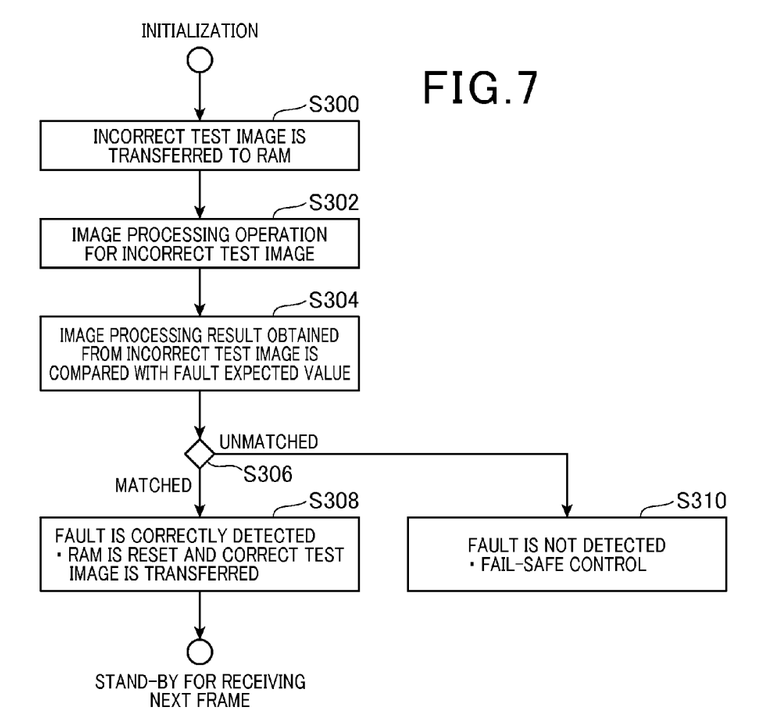
FIG. 7 is a flowchart which shows a procedure of a checking operation.

In step S300, the fault diagnosing section 14d transfers the incorrect test image stored in the ROM 13d to the RAM 12d on condition that the initialization is performed at the time of starting up of the image processing apparatus 1d. The transferred incorrect test image is loaded in a predetermined region in the RAM 12d. In step S302, the fault diagnosing section 14d makes the image processing unit 11d perform the image processing operation for calculating a parallax value for the incorrect test image by using the incorrect test image loaded in the RAM 12d. The image processing unit 11d stores the processing result value for the incorrect test image in the RAM 12d.

In step S304, the fault diagnosing section 14d compares the processing result value obtained from the incorrect test image stored in the RAM 12d with a predetermined fault expected value that defines "fault" so as to determine whether or not they match with each other. They are determined to be matched with each other when the processing result value of the incorrect test image and the fault expected value satisfy the match criteria, and determined not to be matched with each other when they do not satisfy the match criteria. In step S306, a branching process is performed for the fault diagnosing section 14d depending on the determination result of step S304.

When the processing result value of the incorrect test image and the fault expected value are determined as being matched (S306: matched), the process proceeds to step S308. In this case, since it is confirmed that the processing result value of the incorrect image data is determined as "fault", the fault diagnosis function is determined as operating correctly. In step S308, the fault diagnosing section 14d resets the RAM 12d and transfers the correct test image stored in the ROM 13d to the RAM 12d. The procedure of operations subsequent to step S308 corresponds to the procedure of the flowchart of FIG. 2, which is described above in the first embodiment.

On the other hand, when the processing result value of the incorrect test image and the fault expected value are determined as being unmatched (S306: unmatched), the process proceeds to step S310. In this case, since it is not confirmed that the processing result value of the incorrect image data is correctively determined as "fault", the fault diagnosis function is determined as not operating correctly. In step S310, the output controlling section 15d performs fail-safe control. Specifically, the output controlling section 15d notifies a driver via the vehicle control units 2 that the functions of the image processing unit 11d for the image processing operation are unavailable.

[Other Configurations]

A variety of configurations that can be applied to the embodiments will be described. When the image processing operation for the test image is performed by the image processing unit, the image processing operation may be performed by using the test image alone. Alternatively, a test image pattern may be incorporated into a predetermined region in an actual image inputted from the stereo camera so that the image processing operation is performed collectively for the actual image and the test image.

Figure 8:
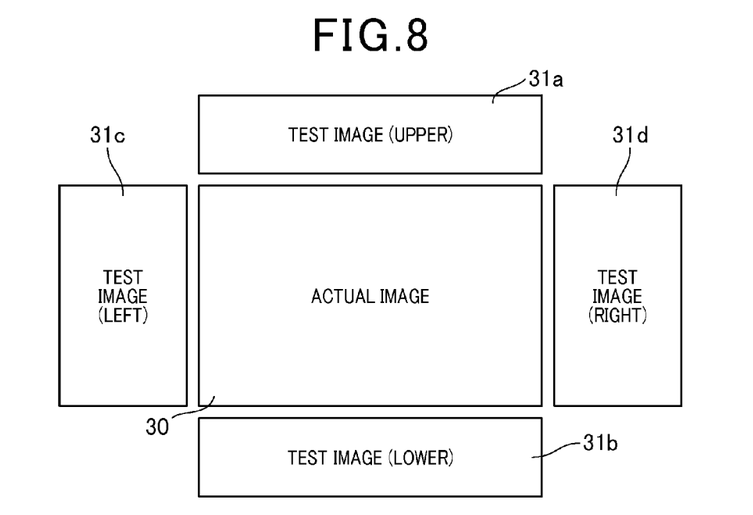
FIG. 8 is an explanatory view which shows an example of an incorporated image.

As shown in FIG. 8 as a specific example of the latter, test image patterns 31a to 30d may be incorporated into blank regions on the upper, lower, right and left sides of an actual image 30 which is actually captured by the stereo camera.

Figure 9:
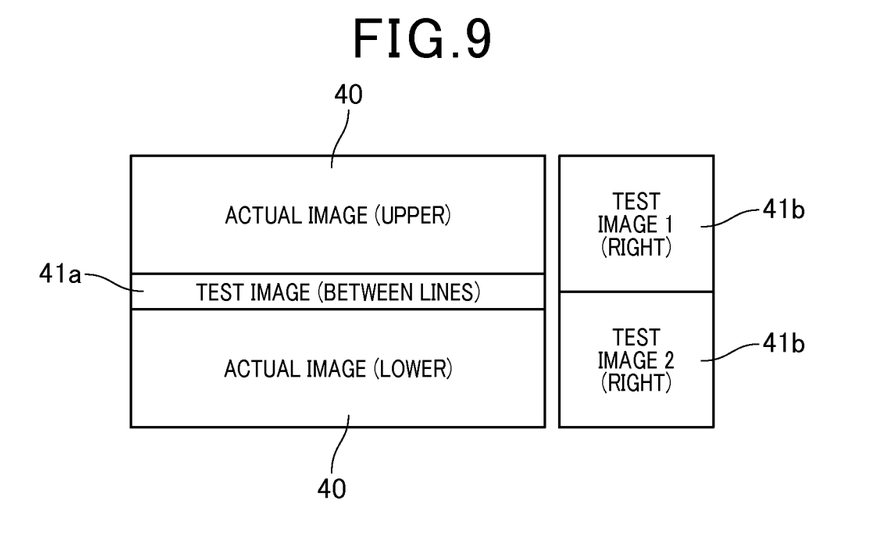
FIG. 9 is an explanatory view which shows an example of the incorporated image.

FIG. 9 shows an example in which a test image pattern 41a is incorporated between lines (raster lines) that form an actual image 40 which is actually captured by the stereo camera 10. In this example, when different parallax calculating methods are used for the regions separated by a boundary located at a certain position in a horizontal direction of the actual image 40, the test image pattern 41a may be incorporated between the boundaries of the regions. FIG. 9 further shows an example in which two types of test images 41b and 41c are incorporated into the region on the right side of the actual image 40. As shown in the figure, different test image patterns may be incorporated as separated by the boundary in the region of the incorporated test images.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, an image processing apparatus includes: an image processing section (11) that periodically performs an image processing operation for a captured image periodically captured by a capturing section (10); a diagnosing section (14) that compares an image processing result obtained from diagnostic image data with an expected value data which indicates a reference for a normal processing result of the image processing operation of the diagnostic image data and determines whether or not the image processing result obtained from the diagnostic image data is normal, by making the image processing section perform an image processing operation for the diagnostic image data stored in advance in a main storage unit which is directly accessible by the image processing section in parallel with the image processing operation periodically performed by the image processing section for the captured image; and an output controlling section (15) that outputs the processing result of the image processing operation for the captured image as valid to a predetermined control section (2) on condition that the image processing result obtained from the diagnostic image data is determined as normal by the diagnosing section.

According to the embodiment, whether or not the image processing section has a fault can be monitored in real time without disturbing a normal routine of the image processing operation since the fault diagnosis based on the diagnostic image data is periodically performed in parallel with a normal periodic routine of the image processing operation by the image processing section. Particularly, in this configuration, the diagnostic image data stored in the main storage unit which is quickly accessible is used in order to perform the operation by the diagnosing section at a high speed in accordance with a cycle of a normal image processing operation. Accordingly, the fault detection is ensured to be performed in parallel with a routine of the image processing operation.

As another aspect of the embodiment, an image processing apparatus includes: an image processing section (11b) that periodically performs an image processing operation for a captured image periodically captured by a capturing section (10b); a diagnosing section (14b) that compares an image processing result obtained from diagnostic image data with an expected value data which indicates a reference for a normal processing result of the image processing operation of the diagnostic image data and determines whether or not the image processing result obtained from the diagnostic image data is normal, by making the image processing section perform an image processing operation by obtaining the diagnostic image data stored in advance in the capturing section in parallel with the image processing operation periodically performed by the image processing section for the captured image; and an output controlling section (15b) that outputs the processing result of the image processing operation for the captured image as valid to a predetermined control section (2) on condition that the image processing result obtained from the diagnostic image data is determined as normal by the diagnosing section (2).

According to the embodiment, the fault diagnosis can be periodically performed based on the diagnostic image data obtained from the capturing section in parallel with a usual periodic routine of the image processing operation by the image processing section. Accordingly, whether or not the input line from the capturing section or the image processing section has a fault can be monitored in real time without disturbing a usual routine of the image processing operation.

What is claimed is:

1. An image processing apparatus, comprising:
an image processing section that periodically performs an image processing operation for a captured image periodically captured by a capturing section;
a diagnosing section that compares an image processing result obtained from diagnostic image data with an expected value data which indicates a reference for a normal processing result of the image processing operation of the diagnostic image data and determines whether or not the image processing result obtained from the diagnostic image data is normal, by making the image processing section perform an image processing operation for the diagnostic image data stored in advance in a main storage unit which is directly accessible by the image processing section in parallel with the image processing operation periodically performed by the image processing section for the captured image; and
an output controlling section that outputs the processing result of the image processing operation for the captured image as valid to a predetermined control section on condition that the image processing result obtained from the diagnostic image data is determined as normal by the diagnosing section.

2. The image processing apparatus according to claim 1, wherein
a plurality of types of the diagnostic image data which correspond to a plurality of types of image processing result by the image processing section are stored in the main storage unit; and
the diagnosing section compares the image processing result obtained from the plurality of types of the diagnostic image data and a plurality of types of the expected value data which correspond to the plurality of types of the diagnostic image data and determines whether or not the image processing result is normal, by making the image processing section perform an image processing operation for the plurality of types of the diagnostic image data.

3. The image processing apparatus according to claim 1, wherein the diagnostic image data is transferred from an auxiliary storage unit that stores the diagnostic image data to the main storage unit on starting up the image processing apparatus.

4. The image processing apparatus according claim 1, further comprising a fail-safe section that does not output the processing result of the image processing operation for the captured image and cancels the processing result and notifies a user of an abnormality, when the image processing result obtained from the diagnostic image data is determined to be abnormal by the diagnosing section.

5. The image processing apparatus according to claim 1, further comprising a restoration section that performs a restoration operation for the image processing section on condition that an event in which the image processing result obtained from the diagnostic image data is determined as abnormal by the diagnosing section occurs consecutively for a predetermined number of times.

6. The image processing apparatus according to claim 1, wherein the diagnosing section makes the image processing section perform an image processing operation for the diagnostic image data in parallel with the image processing operation for the captured image, by making the image processing section perform the image processing operation for an incorporated image in which the diagnostic image data is incorporated into a predetermined region in the captured image which is inputted from the capturing section.

7. The image processing apparatus according to claim 1, wherein:

the diagnosing section makes the image processing section perform an image processing operation for an incorrect diagnostic image data which is provided to have the image processing result which becomes incorrect to the expected value data at a time of start up, so as to determine whether or not the image processing result obtained from the incorrect diagnostic image data satisfies a predetermined fault condition; and on condition that the image processing result obtained from the incorrect diagnostic image data is determined by the diagnosing section as satisfying the fault condition, the diagnostic image data is transferred from an auxiliary storage unit that stores the diagnostic image data to the main storage unit, and subsequently, the diagnosing section determines whether or not the image processing result obtained from the diagnostic image data is normal by using the diagnostic image data stored in the main storage unit.

8. The image processing apparatus according to claim 1, wherein the diagnosing section makes the image processing section perform an image processing operation for the diagnostic image data stored in advance in the capturing section and the diagnostic image data stored in the main storage unit in an alternating manner, so as to determine whether or not the image processing result obtained from each of the diagnostic image data is normal, and the image processing apparatus includes an identification section that identifies a fault location depending on a pattern of the determination result by the diagnosing section for each of the diagnostic image data of the capturing section and the main storage unit, and a restoration section that performs a restoration operation for the fault location identified by the identification section.

9. An image processing apparatus, comprising:

an image processing section that periodically performs an image processing operation for a captured image periodically captured by a capturing section;

a diagnosing section that compares an image processing result obtained from diagnostic image data with an expected value data which indicates a reference for a normal processing result of the image processing operation of the diagnostic image data and determines whether or not the image processing result obtained from the diagnostic image data is normal, by making the image processing section perform an image processing operation by obtaining the diagnostic image data stored in advance in the capturing section in parallel with the image processing operation periodically performed by the image processing section for the captured image; and an output controlling section that outputs the processing result of the image processing operation for the captured image as valid to a predetermined control section on condition that the image processing result obtained from the diagnostic image data is determined as normal by the diagnosing section.

* * * * *